US010694895B2

(12) United States Patent
Zakowski et al.

(10) Patent No.: US 10,694,895 B2
(45) Date of Patent: Jun. 30, 2020

(54) FOOD PROCESSOR HAVING INDEXING STORAGE CONTAINERS

(71) Applicants: Joseph W. Zakowski, Avon, CT (US); Bryan Hotaling, Harvard, MA (US); Matthew Naples, Acton, MA (US); John MacNeill, Acton, MA (US)

(72) Inventors: Joseph W. Zakowski, Avon, CT (US); Bryan Hotaling, Harvard, MA (US); Matthew Naples, Acton, MA (US); John MacNeill, Acton, MA (US)

(73) Assignee: CONAIR CORPORATION, Stamford, CT (US)

( * ) Notice: Subject to any disclaimer, the term of this patent is extended or adjusted under 35 U.S.C. 154(b) by 1006 days.

(21) Appl. No.: 15/014,152

(22) Filed: Feb. 3, 2016

(65) Prior Publication Data

US 2017/0215647 A1 Aug. 3, 2017

(51) Int. Cl.
*A47J 43/046* (2006.01)
*A47J 43/07* (2006.01)

(52) U.S. Cl.
CPC ......... *A47J 43/0727* (2013.01); *A47J 43/046* (2013.01); *A47J 43/0716* (2013.01)

(58) Field of Classification Search
CPC .. A47J 43/044; A47J 43/0727; A47J 43/0716; A47J 43/0761; A47J 43/08; A47J 43/082; A47J 43/046; A47J 43/04436; B02C 1/08; B02C 17/02; B65D 21/02; A47G 23/06
USPC ........................................ 241/92, 100, 278.1
See application file for complete search history.

(56) References Cited

U.S. PATENT DOCUMENTS

| | | | |
|---|---|---|---|
| 2,575,770 A | 11/1951 | Roop | |
| 3,013,692 A | 12/1961 | Chesley | |
| 3,642,168 A | 2/1972 | Wiley, Jr. et al. | |
| 3,759,416 A * | 9/1973 | Constantine | B65D 21/0219 206/505 |
| 4,483,455 A * | 11/1984 | Prophet, Jr. | A47G 23/06 220/23.83 |
| 4,586,666 A | 5/1986 | Fox | |
| 5,018,675 A | 5/1991 | Gateaud | |
| 5,421,248 A * | 6/1995 | Hsu | A47J 19/027 241/282.1 |
| 5,433,144 A * | 7/1995 | Lee | A47J 19/027 99/511 |
| 5,735,193 A * | 4/1998 | Chang | A47J 43/044 241/282.1 |
| 5,921,485 A * | 7/1999 | Plavcan | A47J 43/0777 241/282.2 |
| 6,971,597 B2 * | 12/2005 | Starr | A47J 43/0716 241/278.1 |

(Continued)

*Primary Examiner* — Shelley M Self
*Assistant Examiner* — Smith Oberto Bapthelus
(74) *Attorney, Agent, or Firm* — Grogan, Tuccillo & Vanderleeden, LLP

(57) ABSTRACT

A food processor includes a base, a motor disposed within the base, a drive shaft operatively connected to the motor and extending outwardly from the base, the output shaft being rotatable upon actuation of the motor, a bowl mounted on the base for containing food items, a lid for covering the bowl and having an opening therein, at least one storage container receivable within said bowl, and an indexing mechanism engageable with the at least one storage container and being operable to selectively index the storage container within the bowl.

11 Claims, 10 Drawing Sheets

(56) References Cited

U.S. PATENT DOCUMENTS

| | | | | |
|---|---|---|---|---|
| 7,159,808 B2* | 1/2007 | Starr | A47J 43/0716 | 241/278.1 |
| 7,216,769 B2* | 5/2007 | Palder | B65D 1/22 | 211/49.1 |
| 7,530,510 B2* | 5/2009 | Newman | A47J 43/044 | 241/37.5 |
| 7,619,188 B2* | 11/2009 | Oghafua | A47J 27/004 | 219/600 |
| 8,448,788 B2 | 5/2013 | Krasznai et al. | | |
| 8,584,979 B2 | 11/2013 | Allen | | |
| 8,695,490 B2* | 4/2014 | Harris | A47J 43/1031 | 99/537 |
| 8,733,239 B2* | 5/2014 | Allen | A47J 43/046 | 241/151 |
| 9,089,243 B2* | 7/2015 | Harris | A47J 43/1031 | |
| 9,681,778 B2* | 6/2017 | Pendleton | A47J 43/0711 | |
| 2004/0211850 A1* | 10/2004 | Wanat | A47J 43/0716 | 241/285.1 |
| 2006/0263501 A1* | 11/2006 | Oghafua | A47J 27/004 | 426/523 |
| 2008/0087037 A1* | 4/2008 | Rapaz | F25D 3/08 | 62/457.2 |
| 2008/0190410 A1* | 8/2008 | Krippelz | A47J 37/079 | 126/25 B |
| 2012/0294108 A1* | 11/2012 | Dickson, Jr. | A47J 43/046 | 366/205 |
| 2013/0126650 A1* | 5/2013 | Hotaling | A47J 43/0716 | 241/275 |
| 2013/0334350 A1* | 12/2013 | Wong | A47J 43/082 | 241/68 |
| 2014/0014752 A1* | 1/2014 | Beber | A47J 43/046 | 241/100 |
| 2014/0042255 A1 | 2/2014 | Allen | | |
| 2014/0116164 A1* | 5/2014 | Harris | A47J 43/1031 | 74/30 |
| 2014/0296793 A1* | 10/2014 | Varney | A61M 1/0003 | 604/212 |
| 2014/0299696 A1* | 10/2014 | Zakowski | A47J 43/0716 | 241/100 |
| 2014/0299698 A1* | 10/2014 | Zakowski | A47J 43/0716 | 241/100 |
| 2016/0249772 A1* | 9/2016 | Jays | A47J 43/087 | 366/294 |
| 2017/0215646 A1* | 8/2017 | Zakowski | A47J 43/046 | |
| 2017/0215647 A1* | 8/2017 | Zakowski | A47J 43/0727 | |
| 2017/0217042 A1* | 8/2017 | Zakowski | B26D 7/2628 | |
| 2017/0224167 A1* | 8/2017 | Zakowski | A47J 43/0716 | |
| 2017/0224170 A1* | 8/2017 | Nernberger | A47J 43/046 | |
| 2018/0028011 A1* | 2/2018 | Cheung | A47J 9/002 | |
| 2018/0043564 A1* | 2/2018 | Zakowski | A47J 43/0722 | |
| 2018/0057207 A1* | 3/2018 | Maroofian | A47G 19/23 | |

\* cited by examiner

FOOD PROCESSOR HAVING INDEXING STORAGE CONTAINERS

FIELD OF THE INVENTION

The present invention relates to food processors and, more particularly, to a food processor having indexing storage containers.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is still room for improvement. In particular, the use of existing food processing devices becomes inconvenient when multiple, different foodstuffs must be processed and kept separated. A user is required to essentially disassemble the food processor in order to remove the processed foodstuff from within the bowl in order to keep the processed foodstuff separated from other foodstuffs to be processed subsequently. It would be desirable to have a food processor that would enable the user to keep different processed foodstuffs separated within the bowl without requiring the user to disassemble the food processor and remove the processed foodstuff from within the bowl before beginning to process a different foodstuff.

SUMMARY OF THE INVENTION

It is an object of the present invention to provide a food processor.

It is another object of the present invention to provide a food processor having indexing storage containers capable of receiving different processed food items.

It is another object of the present invention to provide a food processor having indexing storage containers capable of keeping different processed food items separated without requiring a user to disassemble the food processor and remove the processed food items from within the bowl before processing a different food item.

It is another object of the present invention to provide a food processor having indexing storage containers that are removable from a processing bowl.

These and other objects are achieved by the present invention.

According to an embodiment of the present invention, a food processor is provided. The food processor includes a base, a motor disposed within the base, a drive shaft operatively connected to the motor and extending outwardly from the base, the output shaft being rotatable upon actuation of the motor, a bowl mounted on the base for containing food items, a lid for covering the bowl and having an opening therein, at least one storage container receivable within the bowl, and an indexing mechanism engageable with the at least one storage container and being operable to selectively index the storage container within the bowl.

According to another embodiment of the present invention, an indexing storage container system for a food processor is provided. The indexing storage container system includes an actuator, a drive gear operatively attached to the actuator, a first annulus configured to be rotatably driven by the drive gear, a second annulus engageable with the first annulus, and at least one storage container receivable within a bowl of the food processor and engageable with the second annulus, the actuator being operable to selectively index the at least one storage container within the bowl.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
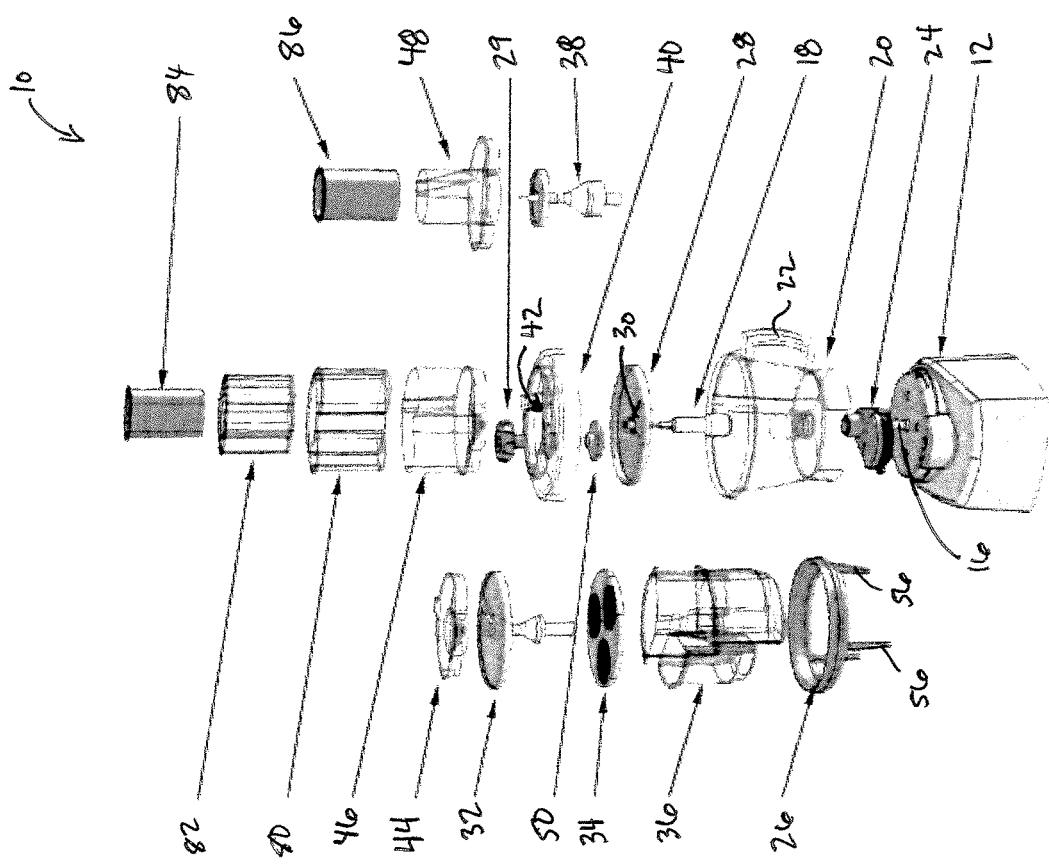
FIG. 1 is an exploded view of a food processor according to an embodiment of the present invention.

Referring to FIG. 1, a food processor 10 according to the present invention is shown. The food processor 10 includes base housing 12 having a motor (not shown) disposed within. The motor is preferably a conventional electric motor that is reversible and has a variable speed between approximately 500-3,500 RPM. The motor is operatively engaged with a drive shaft 16 to cause the drive shaft 16 to rotate. The motor is oriented such that the drive shaft 16 extends upwardly from the motor, extending outwardly and/or protruding from a top surface of the base housing 12. The base housing 12 may include a user interface electrically connected to the motor to enable a user to control the speed of the motor. As is known in the art, the user interface may include one or more knobs, dials, buttons, toggle switches or the like. A terminal end of the drive shaft 16 extends outwardly from the base housing and has a plastic adapter shaft 18 engageable and rotatable therewith. A distal end of the adapter shaft 18 includes a blade coupling configured to engage a cutting blade or other attachment, as discussed hereinafter.

Figure 2:
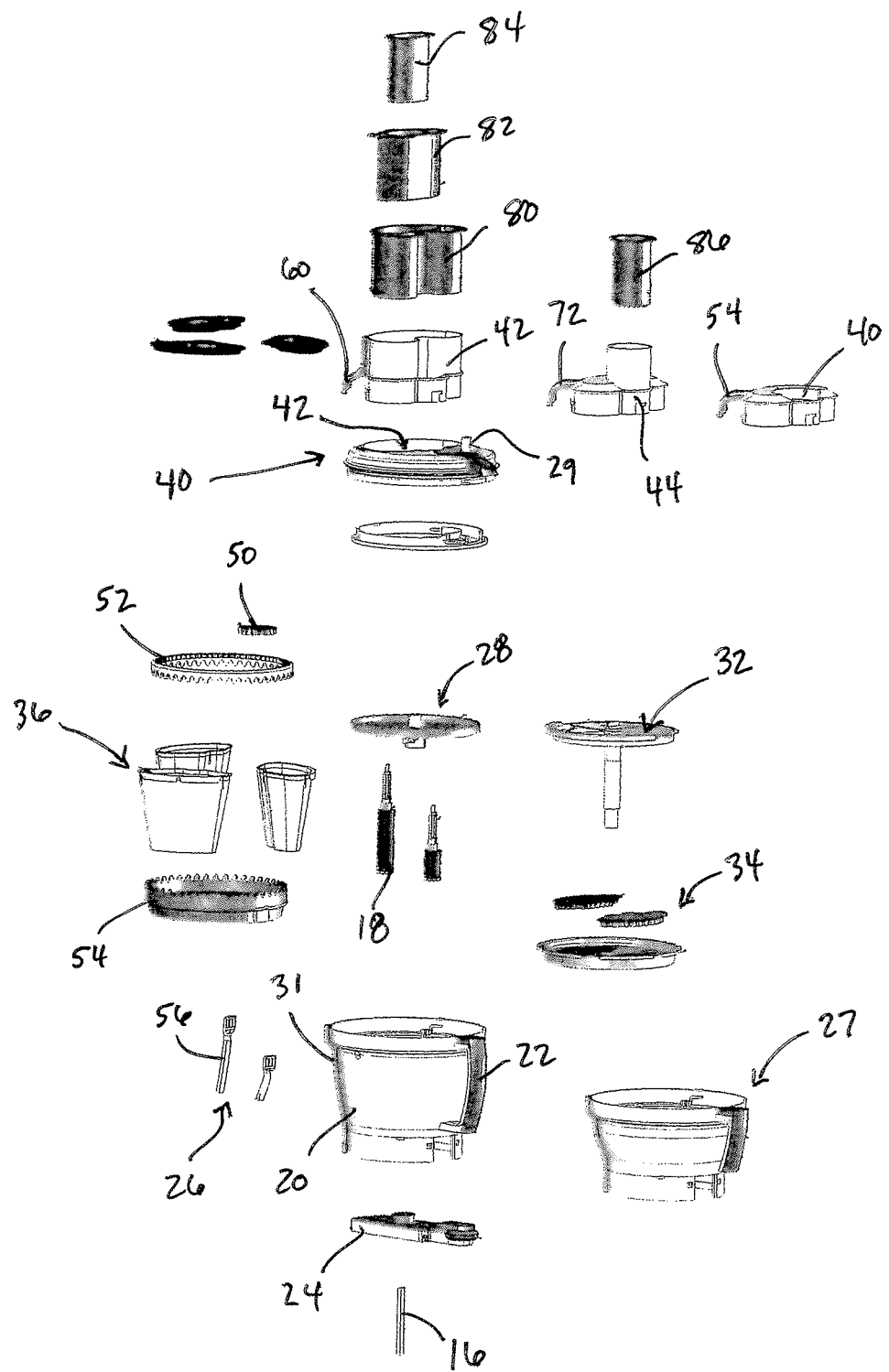
FIG. 2 is an exploded parts view of a food processor according to an embodiment of the present invention.

Referring to FIGS. 1 and 2, the food processor 10 also includes a bowl 20 removably securable on the base housing 12. Preferably, the bowl 20 has a plurality of protrusions that slidingly engage within corresponding slots in the base housing to retain the bowl 20 on the base housing 12. For example, the bowl 20 may be retained on the base 12 via a bayonet style coupling, as is known in the art, that resists forces in both the clockwise and counterclockwise directions. Extending upwardly from the center of the bottom wall of the bowl 20 is a generally cylindrical central tube sized to accommodate the drive shaft 16 therethrough when the bowl 20 is secured to the base housing 12 in an assembled position. A handle 22 is integrally molded to the sidewall of the bowl and extends outwardly therefrom, to provide the user with a gripping surface with which to pick up, carry, and otherwise handle the bowl 20. In an embodiment, the bowl 20 may also be provided with a slicing disc adjustment mechanism 24 configured to mate with the lower end of the adapter shaft 18 and operable from outside the bowl 20 by a user to vary the slice thickness of food items. In addition, the bowl 20 may be provided with a sidewall cleaning mechanism 26 having a plurality of scraper blades or wipers that contact the inner sidewall of the bowl 20. The sidewall cleaning mechanism 26 includes a knob 29 accessible above the bowl 20 that is selectively rotatable by a user to cause the wipers to rotate about the inner periphery of the bowl 20 to scrape the sides of the bowl 20 during processing of food items, as discussed in detail hereinafter.

As shown in FIG. 2, a smaller capacity bowl 27 may be mounted to the base 12 in lieu of the larger capacity bowl 20, such as when a smaller volume of food is to be processed. In an embodiment, the bowl 20 has a 16-cup capacity and the smaller bowl 27 has a 4-8 cup capacity.

As best shown in FIG. 2, the bowl 20 may also include an optical channel 31 on the periphery thereof. The optical channel 31 is configured to receive an optical signal generated by the control unit within the base 12 to ensure the bowl 20 is properly seated on the base 12, and a lid is properly seated on the bowl 20. For example, when an optical signal sent from the base is reflected and received back at the base by an optical sensor, this indicates that the base, bowl and lid are in proper position for food processing. This "optical interlock" ensures that the motor will not operate, and the processing tool will not rotate, unless the bowl and lid are in proper position.

Although the base housing 12 is shown as being generally square-shaped, it is within the spirit and scope of the present invention that the base housing 12 be of a different shape as long as the base housing 12 can still perform its intended functions, as described herein. Additionally, although the bowl 20 is shown as being removably retained at the top of the base housing 12, it is within the spirit and scope of the present invention that the base housing 12 be generally L-shaped when viewed from the side, such that the motor is disposed within the vertically-oriented portion and the bowl 20 is disposed on top of the horizontally-oriented portion.

As further shown in FIGS. 1 and 2, a cutting tool 28 is rotatably securable to the drive shaft 16. In particular, the cutting tool 28 is rotatably fixed to the adapter shaft 18 proximate the terminal end of the drive shaft 16 and is positioned within the bowl 20 above the top edge of the central tube, when in the assembled position. In an embodiment, the cutting tool 28 is a generally circular metallic disk having at least one slicing blade 30 formed therein as is well understood by those of ordinary skill in the art.

Alternatively, a dicing mechanism including a dicing blade 32 and a dicing plate 34 may be utilized in place of the cutting tool 28 in order to dice food items. In connection with the dicing mechanism, a plurality of indexing storage containers 36 may be inserted into the bowl 20 in nested position with the wiper element 26, below the dicing plate 34. The wiper element 26 may be selectively rotated by a user to index the storage containers 36 to a desired position beneath the dicing plate 34 to collect diced food items therein. In yet another embodiment, a spiral cutting blade assembly 38 may be utilized in place of the cutting tool 28 in order to cut food items into spiral shapes.

The food processor 10 further includes a lid 40 that is removably securable to a top of the bowl 20. The lid 40 defines a substantially circular body sized and dimensioned to cover the bowl 20, and has an opening 42 formed therein configured to receive one of a flat cover 44, a large feed tube 46 or a spiral feed tube 48, as selected by a user, as best shown in FIGS. 1 and 2. The opening 42 in the lid may be generally oval or kidney shaped, although other shapes and dimensions are envisioned. As illustrated in FIGS. 1 and 2, the flat cover 44, large feed tube 46 and spiral feed tube 48 each include a lower portion sized and shaped to be received in the opening 42, and a peripheral flange limiting the insertion depth of the respective flat cover 44, large feed tube 46 or spiral feed tube 48 into the opening 42 and preventing such components from falling into the bowl 20.

As also shown in FIGS. 1 and 2, the large feed tube 46 may include a pusher assembly having a plurality of nestable pushers including a first pusher 80, a second pusher 82 and a third pusher 84. Similarly, the spiral feed tube 48 may include a pusher 86 dimensioned to be slidably received therein. The various pushers may be utilized to urge food items through the lid 40 and into the cutting tool 28 or other food processing implement within the bowl, in a manner heretofore known in the art.

Turning now to FIGS. 3-6, the sidewall cleaning mechanism 26 of the food processor 10 is illustrated. The sidewall cleaning mechanism 26 includes rotatable knob 29, a drive gear 50 fixedly connected to the rotatable knob 29, a first annulus 52 configured to be rotatably driven by the drive gear 50, a second annulus 54 engageable with the first annulus 52, and a plurality of wiper blades 56 attached to the second annulus 54 and configured to contact the interior sidewall of the bowl 20.

Figure 5:
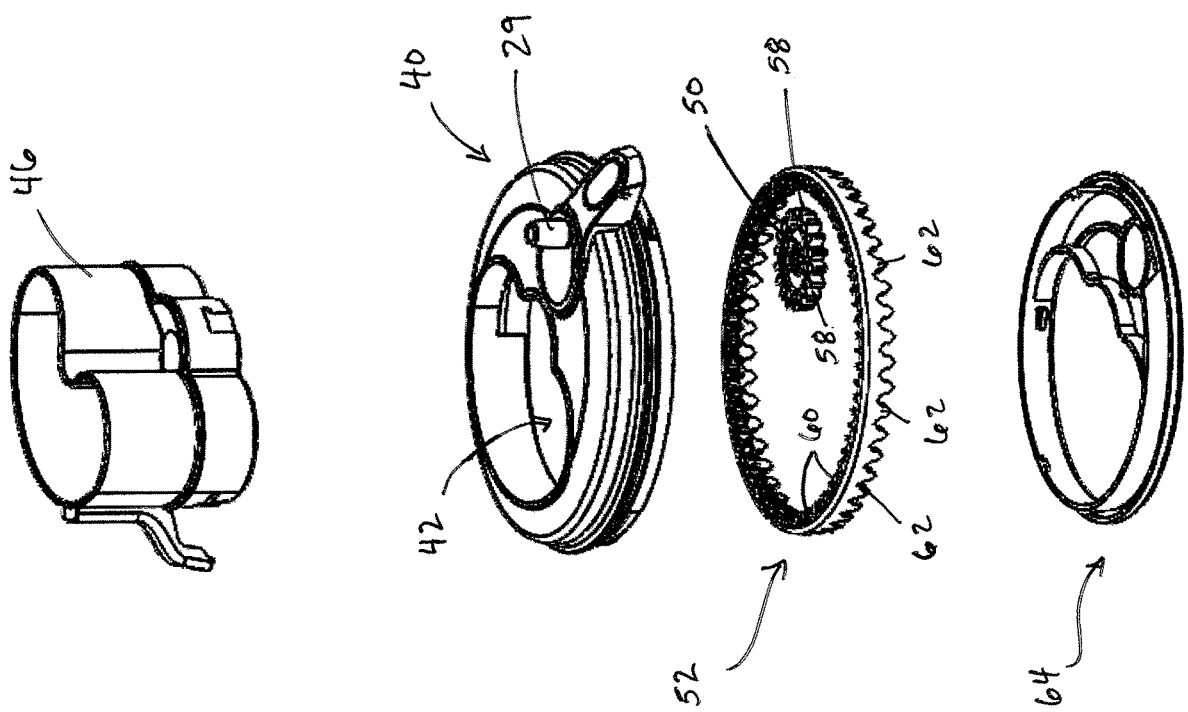
FIG. 5 is an exploded, perspective view of the lid of FIG. 4.

As best shown in FIG. 5, the rotatable knob 29 is offset from the center of the lid 40 and is located adjacent to a periphery thereof. The knob 29 projects upward from the top surface of the lid 40 and is operatively attached to the drive gear 50 positioned beneath the top surface of the lid 40 such that rotation of the knob 29 rotates the drive gear 50. As shown therein, the drive gear 50 has a plurality of teeth 58 extending radially outward from a periphery thereof. The teeth 58 of the drive gear 50 are configured to mesh with a first plurality of teeth 60 that project radially inward from the first annulus 52. The first annulus 52 also has a second plurality of teeth 62 that project substantially downward therefrom, the purpose of which will be discussed hereinafter. As also shown in FIG. 5, a retaining plate 64 is utilized to hold the drive gear 50 and first annulus 52 in position within the lid 40. Accordingly, in the preferred embodiment, the lid 40 houses the rotatable knob 29, the drive gear 50 and the first annulus 52 of the sidewall cleaning mechanism 26. Importantly, while the retaining plate 64 holds these components within the lid, the teeth 62 of the first annulus 52 project downwardly from the lid 40 and are not obstructed by the retaining plate 64.

Figure 3:
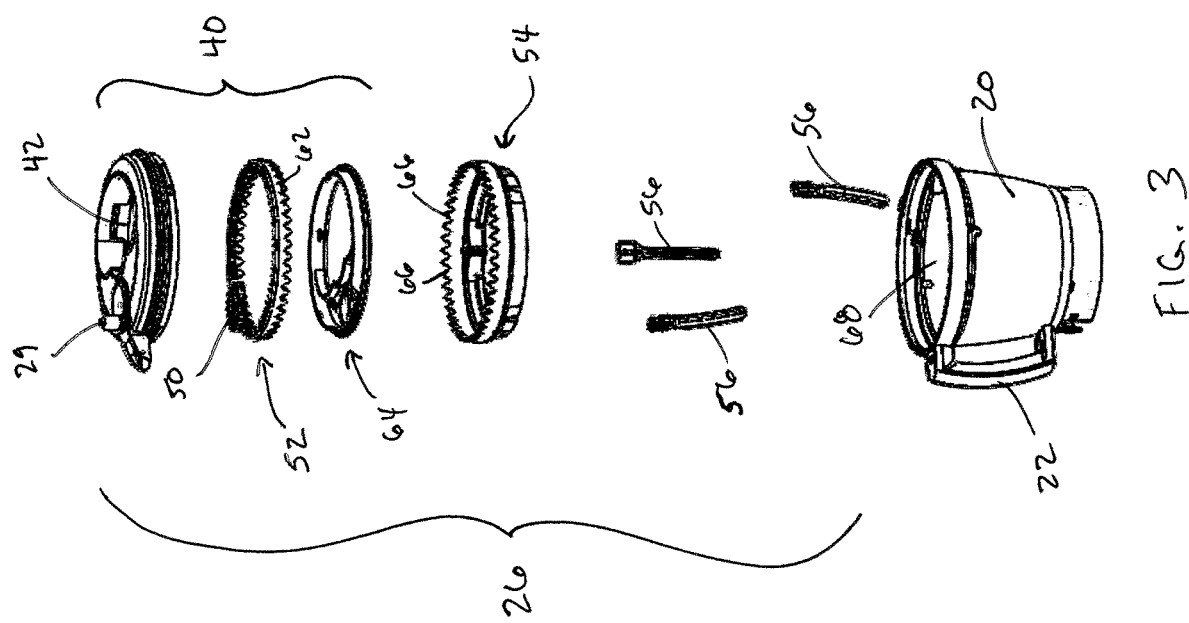
FIG. 3 is an exploded, perspective view of an indexing mechanism, including a sidewall cleaning mechanism for scraping the interior walls of a processing bowl of the food processor, according to an embodiment of the present invention.
Figure 4:
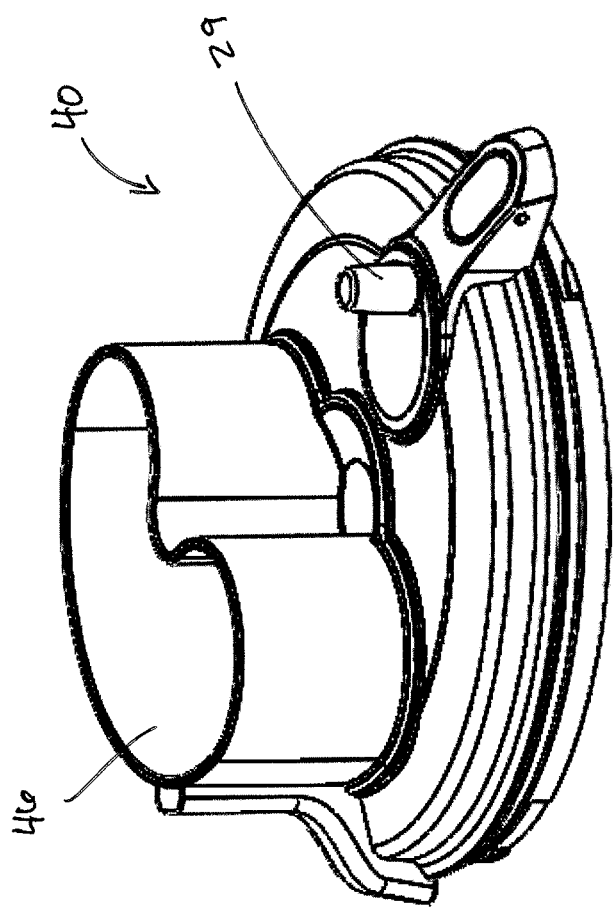
FIG. 4 is a perspective view of the lid of the food processor.
Figure 6:
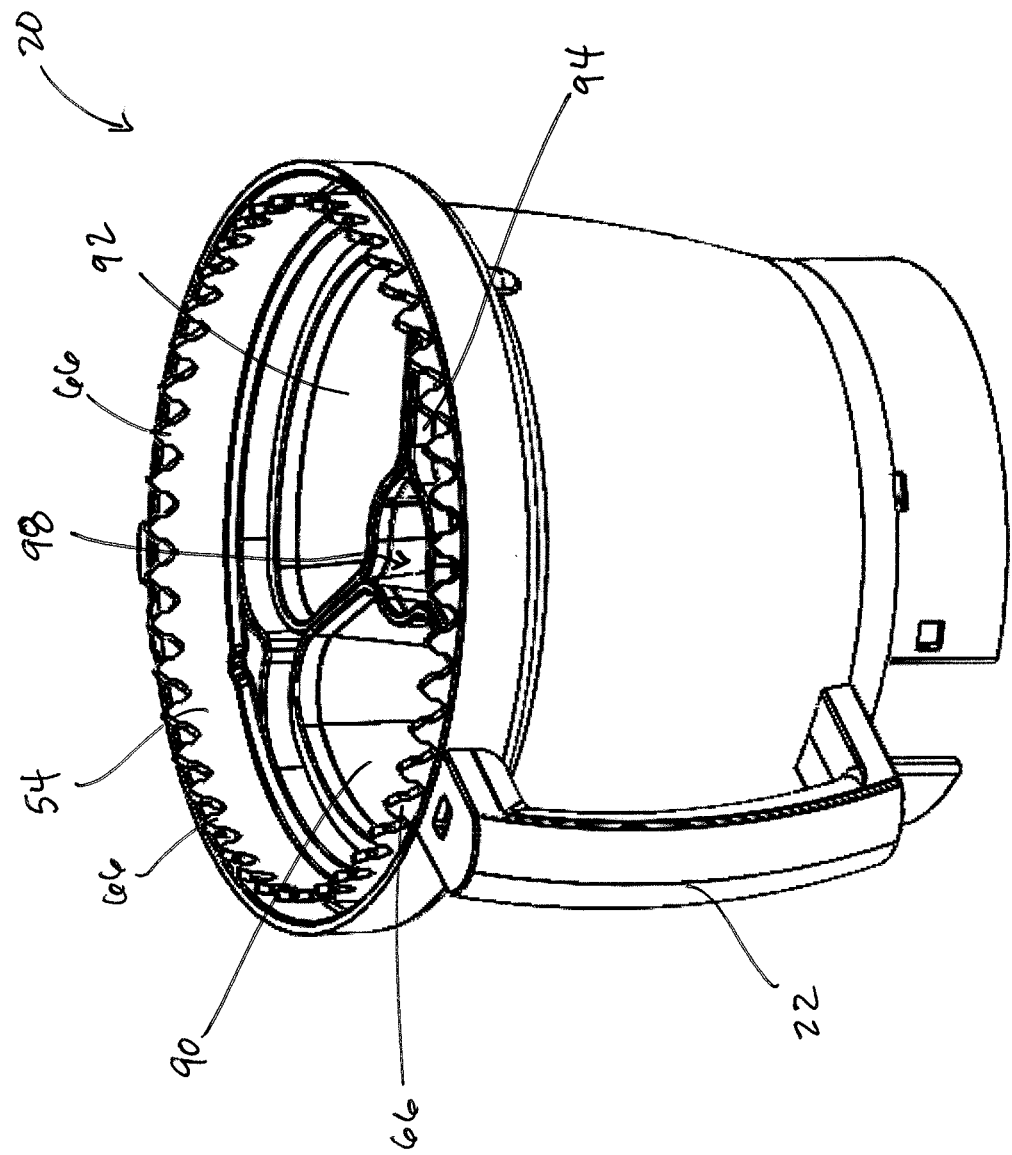
FIG. 6 is a perspective view of the bowl of the food processor, showing a plurality of indexing storage containers in position within the bowl.

With reference to FIGS. 3 and 6, the second annulus 54 includes a third plurality of teeth 66 that project substantially upward therefrom. The wiper blades 56 are attached to the second annulus 54 and project downwardly therefrom. In an embodiment, the wiper blades 56 are fixedly attached to the second annulus 54. In other embodiments, the wiper blades 56 may be removably attached to the second annulus 54 to allow for replacement thereof. The length of the wiper blades 56 preferably corresponds to the height of the interior sidewall 68 of the bowl 20. The wiper blades 56 are preferably manufactured from a resilient material capable of bending slightly so that a substantially uniform contact with the interior sidewall 68 of the bowl 20 along their length is achieved. For example, the blades 56 (or an edge portion thereof) may be manufactured from rubber, although other materials known in the art may also be utilized without departing from the broader aspects of the present invention. In the preferred embodiment there are three wiper blades 56 spaced evenly about a periphery of the second annulus, although more or fewer than three blades may be utilized without departing from the broader aspects of the present invention.

As best shown in FIG. 6, the second annulus 54 is configured to be received by the processing bowl 20 such that the wiper blades 56 contact the interior sidewall 68 of the bowl 20 and the third plurality of teeth 66 of the second annulus 54 extend slightly above the top rim of the bowl 20. These teeth 66 are configured to mesh with the second plurality of teeth 62 that project downward from the first annulus when the lid 40 is placed atop the bowl 20. Accordingly, in the preferred embodiment, the second annulus 54 and the wiper blades 56 thereof are housed by the bowl 20.

In operation, the bowl 20 is mounted on the base and a food processing implement is inserted therein and engaged with the drive shaft 16. The second annulus 54 may then be inserted into the bowl 20 such that the wiper blades 56 contact the interior sidewall 68 of the bowl. The lid 40 can then be placed atop the bowl 20 and locked into place in a manner heretofore known in the art. When properly received atop the bowl 20, the teeth 62 of the first annulus 52 mesh with the teeth 66 of the second annulus 54. A user can the select one of the flat cover 44, large feed tube 46 or spiral feed tube 48 and place such cover or feed tube within the opening 42 in the lid 40. Food items inserted into the bowl 20 may then be processed in a manner known in the art.

As indicated above, during processing, partially processed food items may be thrown by the processing implement against the sidewall 68 of the bowl 20, out of reach of the processing implement. Rather than stopping processing and removing the lid to manually scrape the sidewalls of the bowl, the present invention allows a user to clean the sidewalls of the bowl 20 while processing continues. In particular, when partially processed food items build up on the interior sidewalls 68, a user can simply rotate the knob 29 projecting from the top of the lid 40. Rotation of the knob 29 causes the drive gear 50 attached thereto to rotate, which correspondingly rotates the first annulus 52 by way of engagement of the teeth 58 of the drive gear 50 with the first plurality of teeth 60 of the first annulus 52. Likewise, rotation of the first annulus 52 causes the second annulus 54 to correspondingly rotate due to the engagement of the second plurality of teeth 62 of the first annulus 52 with the third plurality of teeth 66 of the second annulus 54. This rotation of the second annulus 54 causes the wiper blades 56 to travel along the interior sidewalls 68 of the bowl 20, scraping the foodstuff therefrom and urging it downwards and into contact with the processing implement.

As will be readily appreciated, therefore, the sidewall cleaning mechanism 26 of the present invention is easily actuatable by simple rotation of a knob accessible at the top of the lid 40 of the food processor 10. Importantly, the sidewall cleaning mechanism 26 of the present invention obviates the need to stop processing and remove the lid of the food processor in order to manually scrape the walls of foodstuffs to ensure uniform processing, thereby adding a level of functionality heretofore not seen in the art. Moreover, the provision of a rotatable knob 29 allows the second annulus 54 and wiper blades 56 thereof to be rotated within the bowl 20 continuously, in either a clockwise or counterclockwise direction. Indeed, the wiper blades 56 may be rotated 360 degrees within the bowl 20, with no limit stop, providing for 360 degree coverage of the interior sidewalls 68 thereof.

Figure 7:
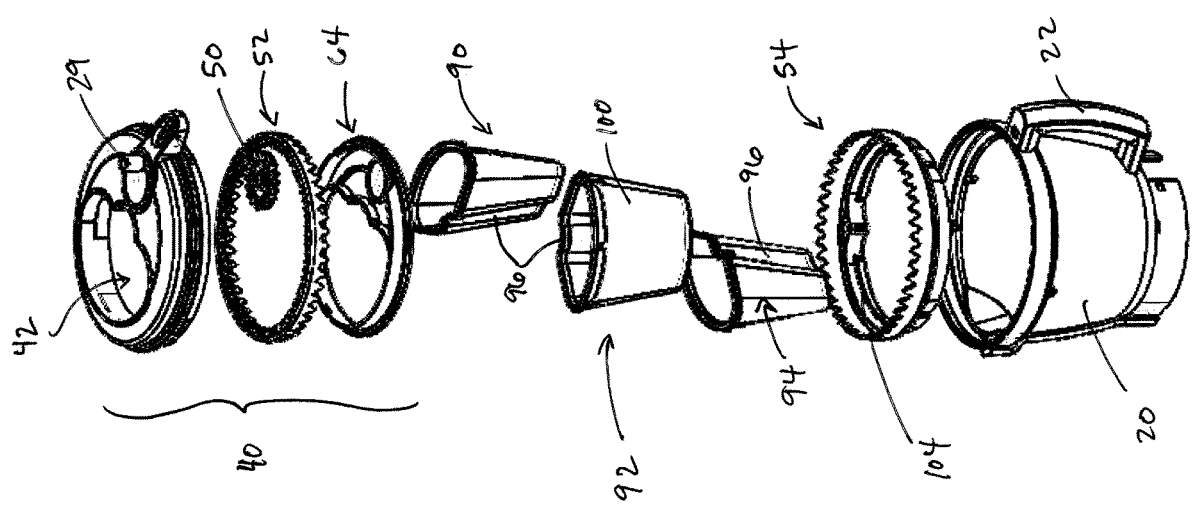
FIG. 7 is an exploded, perspective view of the bowl and lid of the food processor.
Figure 8:
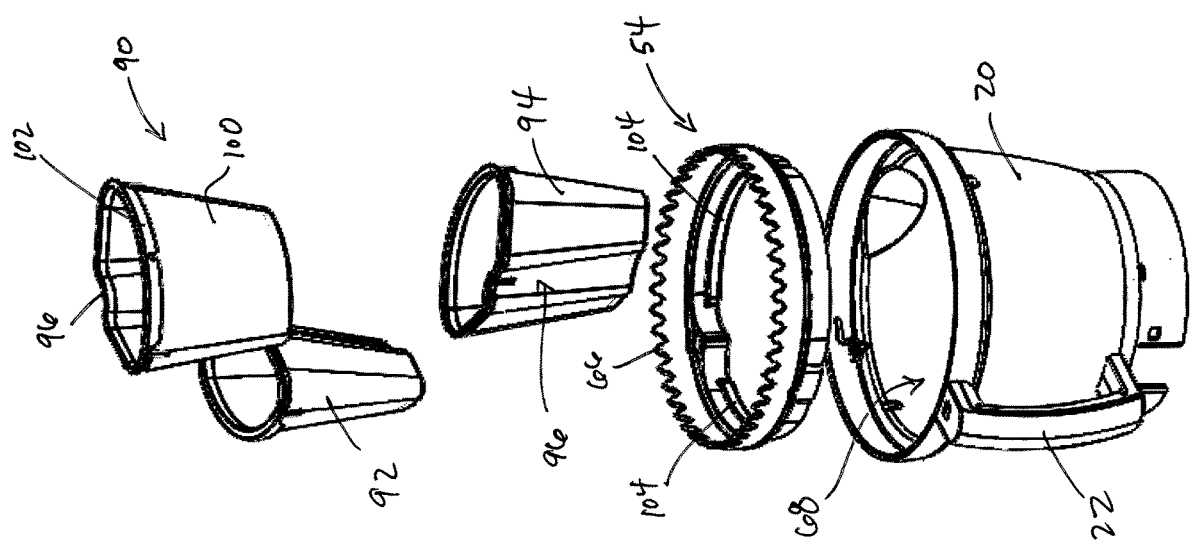
FIG. 8 is an exploded, perspective view of the bowl of the food processor, showing the indexing storage containers.

Referring now to FIGS. 7 and 8, the food processor 10 may also include a plurality of indexing storage containers 90, 92, 94 receivable in the bowl 20 and being selectively rotatable within the bowl 20, as discussed hereinafter. As shown therein, the storage containers 90, 92, 94 are substantially identical to one another and are generally triangular in shape when viewed from above. Each of the containers has a tapered shape such that the cross-sectional area at the top of the container is greater than the cross-sectional area at the bottom of the container, enabling the containers to be nested with one another for compact storage.

Each of the containers 90, 92, 94 includes an arcuate relieved portion 96 at the inner edge of the container; the relieved portions 96 cooperate to form a generally cylindrical passageway 98 when the containers 90, 92 94 are inserted into the bowl 20, as best illustrated in FIG. 6. Importantly, the passageway 98 allows passage of the adapter shaft 18 therethrough, as discussed in detail below. Opposite the relieved portion 96 is a convex, outer peripheral wall 100 that has a radius that substantially corresponds to the inner radius of the second annulus 54.

Figure 9:
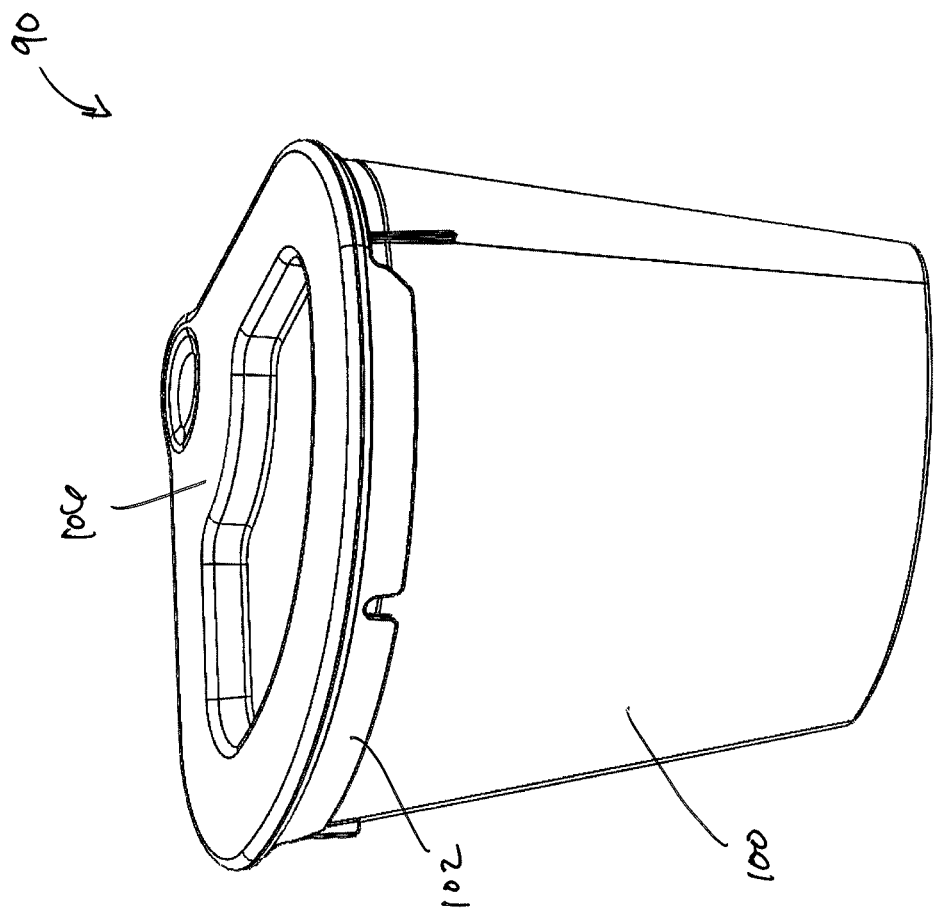
FIG. 9 is a perspective view of an indexing storage container according to an embodiment of the present invention, with a lid engaged with the container.
Figure 10:
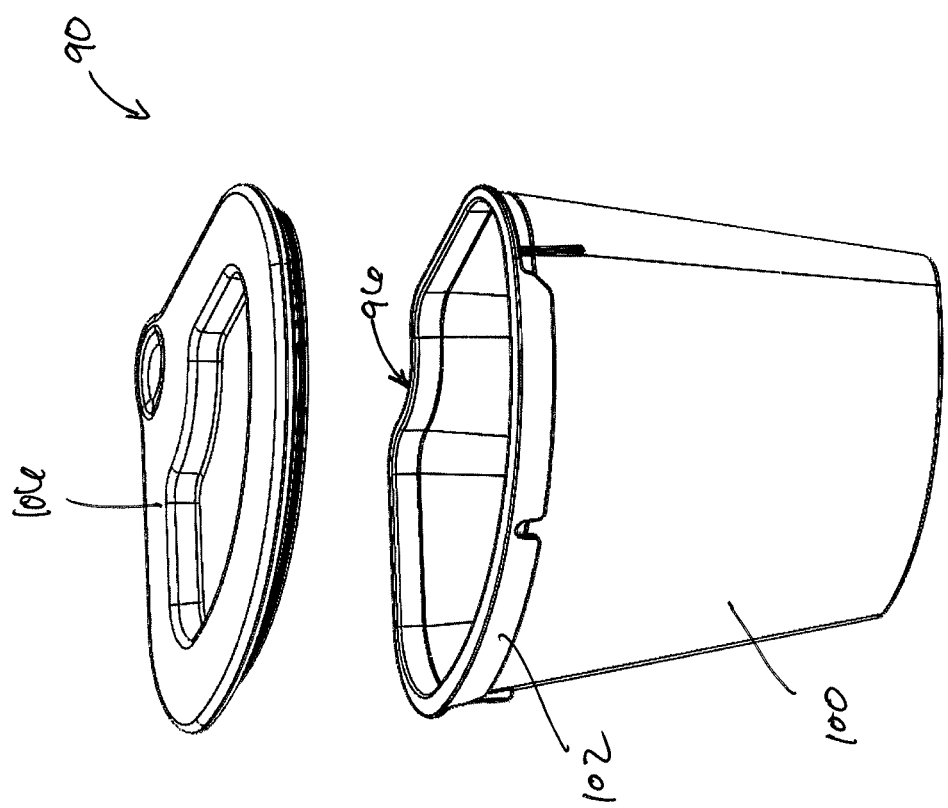
FIG. 10 is a perspective view of the indexing storage container of FIG. 9 with the lid removed.

As best illustrated in FIGS. 9 and 10, each container 90, 92, 94 includes an overhanging lip 102 adjacent to the top edge of the outer peripheral wall 100. The lip 102 is configured to be received in a corresponding groove 104 formed on the inner periphery of the second annulus 54. In the preferred embodiment, the annulus 54 may be divided into three segments each having a groove 104. Alternatively, the groove 104 may extend entirely about the inner periphery of the second annulus 54. In certain embodiments, the groove 104 may be formed as a shoulder configured to contact the lip 102 of each container to limit downward travel of the containers and to retain the containers in fixed position with respect to the second annulus 54.

In operation, the containers 90, 92, 94 may be inserted into the bowl 20 once the second annulus 54 is received therein such that the lip 102 of each container is received in the corresponding groove 104 in the second annulus. In this position, the containers 90, 92, 94 cooperate to define central passageway 98 through which the adapter shaft 18 extends. A user may then selectively couple a desired cutting implement, such as cutting tool 28, to the adapter shaft 18 such that the cutting tool 28 sits above the storage containers 90, 92, 94. Alternatively, dicing blade 32 and a dicing plate 34 may be utilized in place of the cutting tool 28 if dicing of food items is desired. The lid 40 may then be placed atop bowl 20 in the manner discussed above such that the teeth 52 of the first annulus 50 mesh with the teeth 66 of the second annulus 54. A user may then rotate the knob 29 to rotate the second annulus 54 within the bowl 20, which correspondingly indexes the containers 90, 92, 94 within the bowl 20. Importantly, the containers 90, 92, 94 may thus be rotated within the bowl 20 to selectively position one of the containers beneath the slicing blade 30 (or dicing blade 32, where used). A user may then insert food items through the lid 40 for processing, in a manner known in the art. Rather than falling into the large bowl 20, however, the processed food items fall into the container 90, 92 or 94 positioned below the blade 30.

When a user desires to process a different food item, the user may simply rotate the knob 29, accessible from outside the bowl, to index another one of the containers 90, 92 or 94 beneath the slicing blade 30 (or dicing blade 32, where used), without requiring removal of the lid 40 and removal of the first processed food item. In the preferred embodiment, three indexing storage containers are utilized, which allow for the processing and separation of three different food items without removal of the lid 40 and without removal of the previously processed food items from the bowl 20. Although three storage containers are illustrated, more or fewer storage containers may be utilized without departing from the broader aspects of the present invention (the size of the storage containers and the annulus 54 would be correspondingly modified to accommodate more or fewer containers).

Once various food items are processed and separated into the respective containers 90, 92, 94, the containers may each be removed from the bowl 20. The containers 90, 92, 94 each include a corresponding lid 106 that may be placed atop the containers once they are removed from the bowl 20, as shown in FIGS. 9 and 10, for subsequent storage of the food items contained therein.

While the embodiments described herein wiper blades 56 attached to the second annulus 54 for cleaning the sidewalls 68 of the bowl 20, the wiper blades 56 may be omitted.

As indicated above, the indexing containers 90, 92, 94 of the present invention allow a user to process different food items consecutively, and to keep such different processed food items separated in different containers without requiring the user to disassemble the food processor and remove the processed food items from within the bowl before beginning to process a different food item. As a result, greater processing efficiency may be realized.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
a base;
a motor disposed within said base;
a drive shaft operatively connected to said motor and extending outwardly from said base, said drive shaft being rotatable upon actuation of said motor;
a bowl mounted on said base for containing food items;
a lid for covering said bowl and having an opening therein;
a plurality of independent storage containers simultaneously received within said bowl, each of said plurality of independent storage containers being selectively and independently removable from said bowl; and
an indexing mechanism engageable with said independent storage containers and being operable to selectively index said independent storage containers within said bowl so as to selectively position one of said plurality of independent storage containers under said opening.

2. The food processor of claim 1, wherein:
said indexing mechanism includes a rotatable knob, a drive gear operatively attached to the rotatable knob, a first annulus configured to be rotatably driven by said drive gear and a second annulus engageable with said first annulus.

3. The food processor of claim 2, further comprising:
at least one wiper blade attached to said second annulus and configured to contact said interior sidewall of the bowl to scrape said interior sidewall.

4. The food processor of claim 2, wherein:
said rotatable knob, said drive gear and said first annulus form a part of said lid.

5. The food processor of claim 4, wherein:
said lid includes a retaining plate that retains said drive gear and said first annulus within said lid.

6. The food processor of claim 4, wherein:
said plurality of independent storage containers are three storage containers.

7. The food processor of claim 6, wherein:
said storage containers cooperate to define a central passageway axially aligned with said drive shaft.

8. The food processor of claim 6, wherein:
said storage containers are nestable with one another.

9. The food processor of claim 6, wherein:
each of said storage containers includes a lid receivable atop said storage container.

10. The food processor of claim 6, wherein:
said drive gear has a plurality of teeth that project radially outward from a periphery thereof and mesh with a first plurality of teeth that project radially inward from the first annulus.

11. The food processor of claim 10, wherein:
said first annulus has a second plurality of teeth that project substantially downward therefrom and are configured to mesh with a third plurality of teeth that project substantially upward from the second annulus when said lid is engaged with said bowl.

* * * * *